US012659633B2

(12) United States Patent
Hu et al.

(10) Patent No.: US 12,659,633 B2
(45) Date of Patent: Jun. 16, 2026

(54) OPTICAL NETWORK UNIT, OPTICAL LINE TERMINAL AND METHOD, DEVICE AND MEDIUM FOR COMMUNICATION

(71) Applicant: Nokia Solutions and Networks Oy, Espoo (FI)

(72) Inventors: Xiao Feng Hu, Shanghai (CN); Dong Xu Zhang, Shanghai (CN); Xiao An Huang, Shanghai (CN); Kai Bin Zhang, Shanghai (CN)

(73) Assignee: Nokia Solutions and Networks Oy, Espoo (FI)

( * ) Notice: Subject to any disclaimer, the term of this patent is extended or adjusted under 35 U.S.C. 154(b) by 308 days.

(21) Appl. No.: 18/489,352

(22) Filed: Oct. 18, 2023

(65) Prior Publication Data

US 2024/0129653 A1     Apr. 18, 2024

(30) Foreign Application Priority Data

Oct. 18, 2022     (CN) .......................... 202211275589.7

(51) Int. Cl.
*H04Q 11/00*          (2006.01)
*H04B 10/50*          (2013.01)

(52) U.S. Cl.
CPC ....... *H04Q 11/0067* (2013.01); *H04B 10/503* (2013.01); *H04Q 2011/0088* (2013.01)

(58) Field of Classification Search
CPC ........ H04Q 11/0067; H04Q 2011/0088; H04B 10/503; H04B 10/07957; H04B 10/572; H04B 10/272; H04J 14/023; H04J 14/0272
See application file for complete search history.

(56) References Cited

U.S. PATENT DOCUMENTS

| | | | |
|---|---|---|---|
| 2014/0233944 A1* | 8/2014 | Vetter | H04J 14/0256 398/67 |
| 2014/0314414 A1* | 10/2014 | Cheng | H04B 10/40 398/68 |
| 2015/0381300 A1 | 12/2015 | Roberts | |
| 2018/0041007 A1* | 2/2018 | Ashida | H01S 5/02415 |
| 2021/0320723 A1* | 10/2021 | Tu | H04B 10/614 |

FOREIGN PATENT DOCUMENTS

| | | |
|---|---|---|
| CN | 113055097 A | 6/2021 |
| WO | 2013/124516 A1 | 8/2013 |

OTHER PUBLICATIONS

Search Report for European Application No. 23204243.2 dated Mar. 6, 2024.
Search Report for European Application No. 23 204 243.2 dated Nov. 12, 2025.

* cited by examiner

*Primary Examiner* — Hibret A Woldekidan

(57)          ABSTRACT

An optical network unit is configured to send a plurality of optical signals with different wavelengths to an optical line terminal. The optical signals in the plurality of optical signals carry indicating information. The indicating information is used to indicate the wavelength serial number of the optical signal and the temperature information of the laser chip when the optical signal is generated. The optical unit is further configured to receive temperature adjustment information from the optical line terminal; and adjust, based on the temperature adjustment information, the emission wavelength of the laser by adjusting the temperature of the laser chip.

16 Claims, 11 Drawing Sheets

900

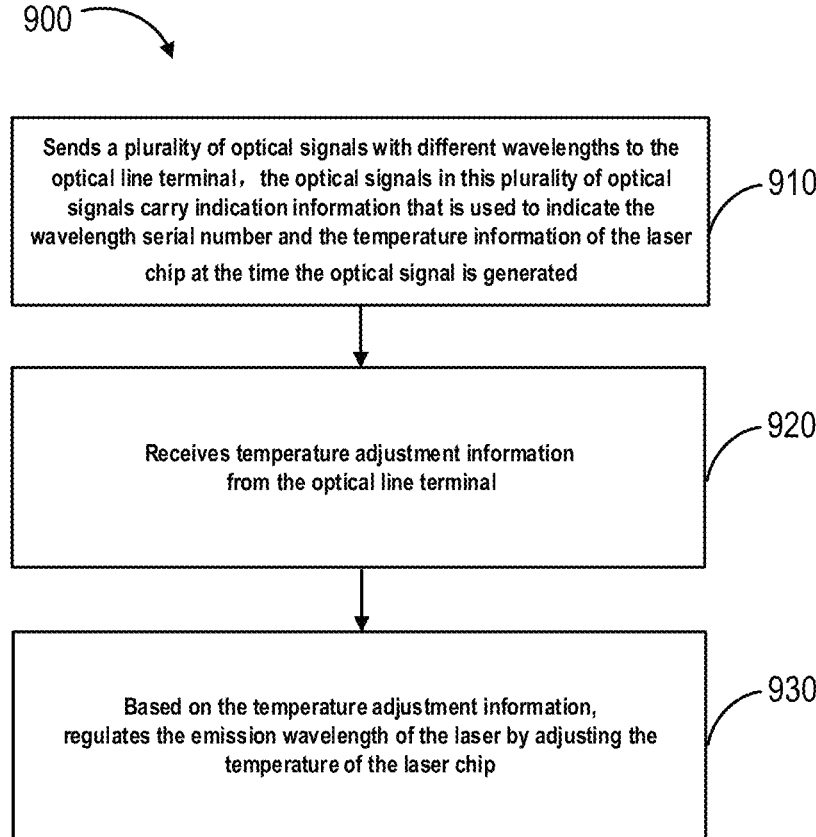

Sends a plurality of optical signals with different wavelengths to the optical line terminal, the optical signals in this plurality of optical signals carry indication information that is used to indicate the wavelength serial number and the temperature information of the laser chip at the time the optical signal is generated — 910

Receives temperature adjustment information from the optical line terminal — 920

Based on the temperature adjustment information, regulates the emission wavelength of the laser by adjusting the temperature of the laser chip — 930

Fig.9

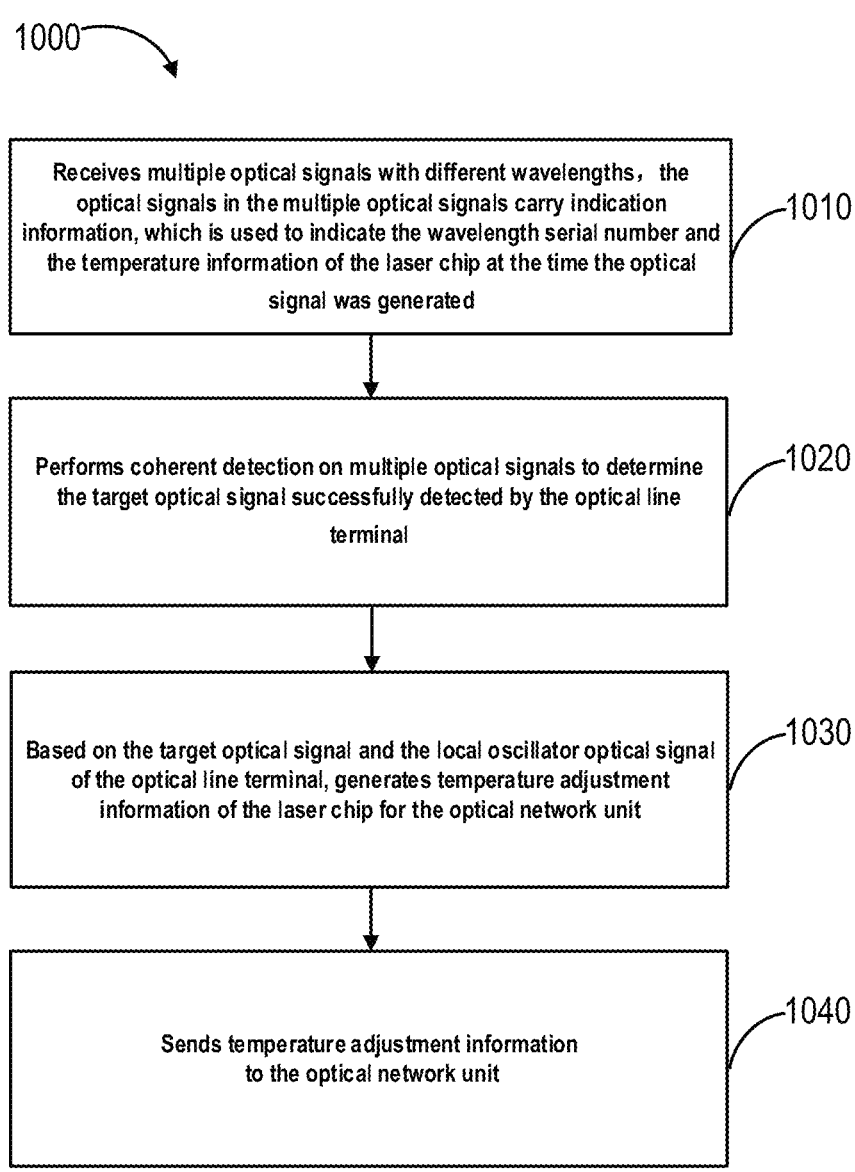

1000

Receives multiple optical signals with different wavelengths, the optical signals in the multiple optical signals carry indication information, which is used to indicate the wavelength serial number and the temperature information of the laser chip at the time the optical signal was generated — 1010

Performs coherent detection on multiple optical signals to determine the target optical signal successfully detected by the optical line terminal — 1020

Based on the target optical signal and the local oscillator optical signal of the optical line terminal, generates temperature adjustment information of the laser chip for the optical network unit — 1030

Sends temperature adjustment information to the optical network unit — 1040

Fig.10

OPTICAL NETWORK UNIT, OPTICAL LINE TERMINAL AND METHOD, DEVICE AND MEDIUM FOR COMMUNICATION

CROSS-REFERENCE TO RELATED APPLICATIONS

The present application claims priority under 35 U.S.C. § 119 to Chinese Patent Application No. 202211275589.7, filed on Oct. 18, 2022, in the Chinese Patent Office, the entire contents of each of which are hereby incorporated by reference.

FIELD

Embodiments of the present disclosure relate to the field of communications, and more specifically to optical network units, optical line terminals, methods for communication, devices for communication, and computer readable media.

BACKGROUND

In order to meet the growing bandwidth requirements of emerging applications such as 5G x-haul transmission, cloud computing and extended reality, in recent years, both academia and industry have conducted in-depth research and demonstration on high-speed passive optical networks (PON) with data rates of 100 Gb/s and above per wavelength. It is very challenging for traditional passive optical networks based on intensity modulation and direct detection (IM/DD) to support such high data rates, This is mainly due to the limited power budget due to low reception sensitivity and poor dispersion tolerance.

On the other hand, coherent passive optical networks have been proposed to improve the receiving sensitivity and effectively recover the signal linear distortion by amplifying the power of the local oscillator (LO). In addition, it provides more dimensions, such as phase and polarization, to modulate the signal, thereby reducing component bandwidth requirements. Although coherent detection has many advantages over traditional IM/DD schemes, it also brings some challenges, such as the high cost of coherent transceivers and the difficulty of coherent up-burst mode detection.

SUMMARY

In general, the embodiment of the present disclosure provides a wavelength tracking mechanism for uplink communication of coherent PON, and relates to an optical network unit, an optical line terminal, a method for communication, a device for communication, and a computer readable medium.

In the first aspect, the embodiment of the disclosure provides an optical network unit (ONU). The optical network unit comprises at least one processor, and at least one memory for storing instructions. The instruction is executed so that the optical network unit at least: Transmit a plurality of optical signals with different wavelengths to the optical line terminal (OLT), the plurality of optical signals in the optical signal carrying indication information, the indication information is used to indicate the wavelength serial number of the optical signal and the temperature information of the laser chip when the optical signal is generated; Receiving temperature adjustment information from the optical line terminal; And based on the temperature adjustment information, the emission wavelength of the laser is adjusted by adjusting the temperature of the laser chip.

In the second aspect, the embodiment of the present disclosure provides an optical line terminal. The optical line terminal includes at least one processor and at least one memory for storing instructions. When the instruction is executed, the optical line terminal at least: receives a plurality of optical signals with different wavelengths from the optical network unit, the plurality of optical signals in the optical signal carries the indication information, the indication information is used to indicate the wavelength serial number of the optical signal and the temperature information of the laser chip when the optical signal is generated; Coherent detection is performed on the multiple optical signals to determine the target optical signal successfully detected by the optical line terminal in the multiple optical signals; Temperature adjustment information of the laser chip for the optical network unit is generated based on the target optical signal and the local oscillator optical signal of the optical line terminal; And send the temperature adjustment information to the optical network unit.

In the third aspect, the embodiment of the present disclosure provides a method for communication. The method comprises: sending a plurality of optical signals with different wavelengths to an optical line terminal by an optical network unit, and the optical signals in the plurality of optical signals carry indication information, which is used to indicate the wavelength serial number of the optical signal and the temperature information of the laser chip when the optical signal is generated; Receiving temperature adjustment information from the optical line terminal; And based on the temperature adjustment information, the emission wavelength of the laser is adjusted by adjusting the temperature of the laser chip.

In the fourth aspect, the embodiment of the present disclosure provides a method for communication. The method comprises: receiving a plurality of optical signals with different wavelengths from an optical network unit by an optical line terminal, and the optical signals in the plurality of optical signals carry indication information, which is used to indicate the wavelength serial number of the optical signal and the temperature information of the laser chip when the optical signal is generated; Coherent detection of the multiple optical signals is performed to determine the target optical signal successfully detected by the optical line terminal in the multiple optical signals; Temperature adjustment information of the laser chip for the optical network unit is generated based on the target optical signal and the local oscillator optical signal of the optical line terminal; And send the temperature adjustment information to the optical network unit.

In the fifth aspect, the embodiment of the present disclosure provides a device for communication. The device comprises a component for the following operations: sending a plurality of optical signals with different wavelengths to an optical line terminal, the optical signals in the plurality of optical signals carry indication information, the indication information is used to indicate the wavelength serial number of the optical signal and the temperature information of the laser chip at the time of generating the optical signal; Receiving temperature adjustment information from the optical line terminal; And based on the temperature adjustment information, the emission wavelength of the laser is adjusted by adjusting the temperature of the laser chip.

In the sixth aspect, the embodiment of the present disclosure provides a device for communication. The apparatus comprises a component for the following operations: receiving a plurality of optical signals with different wavelengths from an optical network unit, the optical signals in the plurality of optical signals carry indication information, the indication information is used to indicate the wavelength serial number of the optical signal and the temperature information of the laser chip at the time of generating the optical signal; Coherent detection is performed on the multiple optical signals to determine the target optical signal successfully detected by the optical line terminal in the multiple optical signals; Temperature adjustment information of the laser chip for the optical network unit is generated based on the target optical signal and the local oscillator optical signal of the optical line terminal; And send the temperature adjustment information to the optical network unit.

In the seventh aspect, the embodiment of the present disclosure provides a computer readable storage medium. The computer-readable storage medium includes program instructions which, when executed by the device, cause the device to perform any of the methods described in aspect 3 or aspect 5 above.

In the eighth aspect, an embodiment of the present disclosure provides a computer program. The computer program includes instructions that, when executed by the device, cause the device to perform any of the methods described in aspect 3 or aspect 5 above.

In the ninth aspect, an embodiment of the present disclosure provides an optical network unit. The optical network unit comprises a transmitting circuit configured to transmit a plurality of optical signals with different wavelengths to an optical line terminal. The optical signals in the plurality of optical signals carry indication information, which is used to indicate the wavelength serial number of the optical signal and the temperature information of the laser chip when the optical signal is generated. The optical network unit also includes a receiving circuit, which is configured to receive temperature adjustment information from the optical line terminal. The optical network unit also includes a regulating circuit that is configured to adjust the emission wavelength of the laser by adjusting the temperature of the laser chip based on the temperature adjustment information.

In the tenth aspect, embodiments of the present disclosure provide an optical line terminal. The optical line terminal comprises a receiving circuit configured to receive a plurality of optical signals with different wavelengths from an optical network unit, and the optical signals in the plurality of optical signals carry indication information, which is used to indicate the wavelength serial number of the optical signal and the temperature information of the laser chip when the optical signal is generated. The optical line terminal also includes a receiving circuit, which is configured to perform coherent detection of multiple optical signals to determine the target optical signal successfully detected by the optical line terminal in the multiple optical signals. The optical line terminal also includes a generating circuit configured to generate temperature adjustment information for the laser chip for use in the optical network unit based on the target optical signal and the local oscillator optical signal of the optical line terminal. The optical line terminal also includes a transmitting circuit configured to transmit temperature adjustment information to the optical network unit.

It should be understood that what is described in the Contents section of the invention is not intended to define a critical or significant feature of this disclosure, nor is it used to limit the scope of this disclosure. Other features of the disclosure will be made easier to understand by the following descriptions.

BRIEF DESCRIPTION OF THE DRAWINGS

The above and other features, advantages and aspects of the embodiments of the present disclosure will become more apparent in conjunction with the drawings and with reference to the detailed descriptions below. In the accompanying drawings, identical or similar drawings marks indicate identical or similar elements, where:

FIG. 9 shows a flow diagram of a method implemented at an ONU according to some example embodiments of the present disclosure;

FIG. 10 shows a flow diagram of a method implemented at an OLT according to some example embodiments of the present disclosure;

In the individual drawings, identical or similar drawings marks indicate identical or similar elements.

DETAILED DESCRIPTION

Figure 1A:
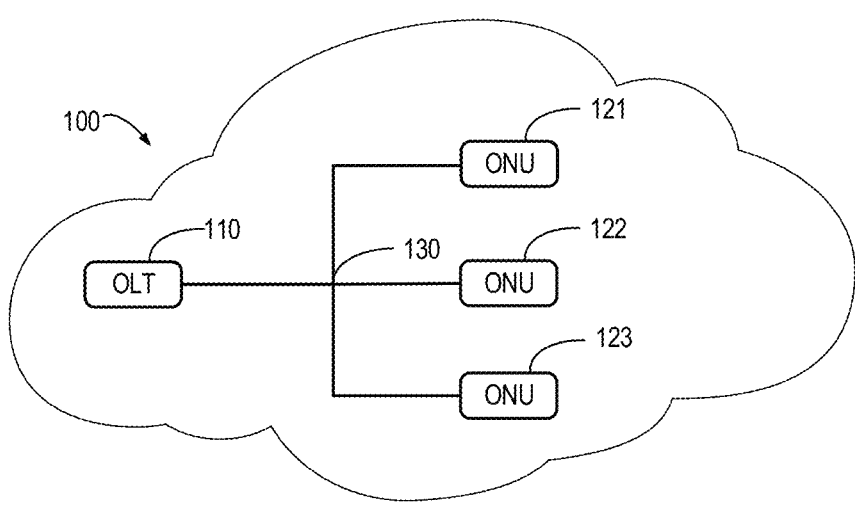
FIG. 1A shows an example optical communication network in which embodiments of the present disclosure can be implemented.

The principle and spirit of the present disclosure are described below with reference to several exemplary embodiments shown in the attached drawings. It should be understood that these specific embodiments are described only to enable those skilled in the art to better understand and implement the disclosure, and not in any way to limit the scope of the disclosure.

As used herein, the term "including" and its equivalents should be understood to mean open-ended inclusion, i.e., "including but not limited to." The term "based" should be understood to mean "based at least in part". The terms "an embodiment" or "the embodiment" should be understood as "at least one embodiment". The terms "first", "second", etc., may refer to different or identical objects. Other explicit and implied definitions may also be included below.

As used herein, the term "determine" covers a wide variety of actions. For example, "determine" may include operation, calculation, processing, derivation, investigation, finding (for example, looking in a table, database, or another data structure), ascertaining, etc. In addition, "determine" can include receiving (e.g., receiving information), accessing (e.g., accessing data in memory), etc. In addition, "OK" can include parsing, selecting, picking, building, etc.

As used herein, the term "circuit" means one or more of the following: (a) hardware-only circuit implementations (such as analog and/or digital circuit implementations only); And (b) combinations of hardware circuits and software, such as (if applicable): (i) combinations of analog and/or digital hardware circuits with software/firmware, and (ii) any part of a hardware processor with software (including digital signal processors, software and memory that work together to enable devices such as optical receivers or other computing devices to perform various functions); And (c) hardware circuits and/or processors, such as microprocessors or parts of microprocessors, which require software (such as firmware) for operation, but may be absent when the software is not required for operation.

The definition of a circuit shall apply to all scenarios in which the term is used in this application (including any claims). As another example, the term "circuit" used herein also covers only a hardware circuit or processor (or processors), or a part of a hardware circuit or processor, or the manner in which its accompanying software or firmware is implemented. For example, the term "circuit" also covers a baseband integrated circuit or processor integrated circuit or similar integrated circuit in an OLT, ONU or other computing device, if applicable to a particular claim element.

As used herein, the terms "optical network", "optical communication network", "passive optical network", and "PON" refer to the inclusion of an optical distribution network (ODN) consisting of passive components such as optical splitters and optical fibers without the need for any active components, Which includes, but is not limited to, Gigabit passive optical networks (GPON), Ten Gigabit passive optical networks (XG-PON), symmetrical Ten Gigabit passive optical networks (XGS-PON), Next generation passive optical networks (NG-PON), and other currently known or future developed optical communication networks.

As used herein, the terms "optical line terminal" and "OLT" refer to a device in an optical network that acts as a service provider node to provide services to end users. An OLT may provide, for example, an electro-optical conversion function to send a signal out through an optical fiber.

As used herein, the terms "optical network unit" and "ONU" refer to a client node connected to an OLT via optical fibers to receive user data from the OLT.

For traditional IM/DD PON systems, the wavelength variation of the different ONUs is not a problem as long as the wavelength of the transmitters of the different ONUs is within the frequency band defined by IEEE or ITU-T standards. However, this becomes different when coherent detection is introduced in the PON receiver. For a coherent PON system, in OLT, the optical signal received from the ONU is mixed with the LO local oscillator light of the OLT, and then input to the BPD for beat processing, due to the limited bandwidth of the BPD, the upstream burst signal from the ONU with the beat signal of the LO may be out of the detection range of the BPD, resulting in no signal being received in the OLT.

Moreover, in order to save the overall cost of PON, directly modulated laser (DML) is usually used in ONU. Due to the production process, there are several nanometers of wavelength variation between different ONUs, corresponding to hundreds of GHz in the frequency domain. However, the bandwidth of BPD is only tens of GHz, and most of them are less than 50 GHz. Therefore, the problem that some ONUs' signals cannot be received by OLTs will be a common phenomenon in the coherent detection of uplink burst-mode signals.

In view of this, the embodiment of the present disclosure provides a wavelength tracking mechanism for uplink communication of coherent PON, in which the OLT can configure the laser chip temperature of the ONU using temperature adjustment information to regulate the wavelength of the ONU, and track the wavelength of the ONU and the temperature corresponding to that wavelength (e.g., Using a wavelength tracking table (WTT)), thus avoiding the problem that the ONU's signal cannot be received by the OLT. In addition, a specially designed sign-up signal is provided for new ONUs to access the OLT.

The rationale and implementation of this disclosure are described in detail with reference to FIGS. 1A through 12. FIG. 1A shows an example optical communication net 100 in which an embodiment of the present disclosure may be implemented. As shown in FIG. 1A, optical communication network 100 includes OLT 110, ONU 121, 122, and 123, and optical line 130 connecting ONU 121-123 to OLT 110. In this example, ONU 121, 122, and 123 can be the same or different ONUs. For example, ONU 121, 122, and 123 can be the same or different in terms of structure, components included, compensation and equalization algorithms employed, etc., but in practice there are differences between the emission wavelengths of individual ONUs.

It should be understood that the structure of the optical communication network shown in FIG. 1 is for illustrative purposes only and does not imply any limitation on the scope of this disclosure. Embodiments of the present disclosure may also be embodied in different optical communication networks. Although only one OLT and three ONUs are shown in FIG. 1A, any appropriate number of OLTs and ONUs may be included in the implementation depending on the size and architecture of the optical communication network. It should also be understood that the optical communication network 100 also includes other components or entities for implementing optical communication, such as optical splitters, etc. These elements or entities may be physical or virtual and may be implemented in any appropriate manner. Furthermore, the elements or entities may communicate with each other using any communication technology currently known and developed in the future.

Figure 1B:
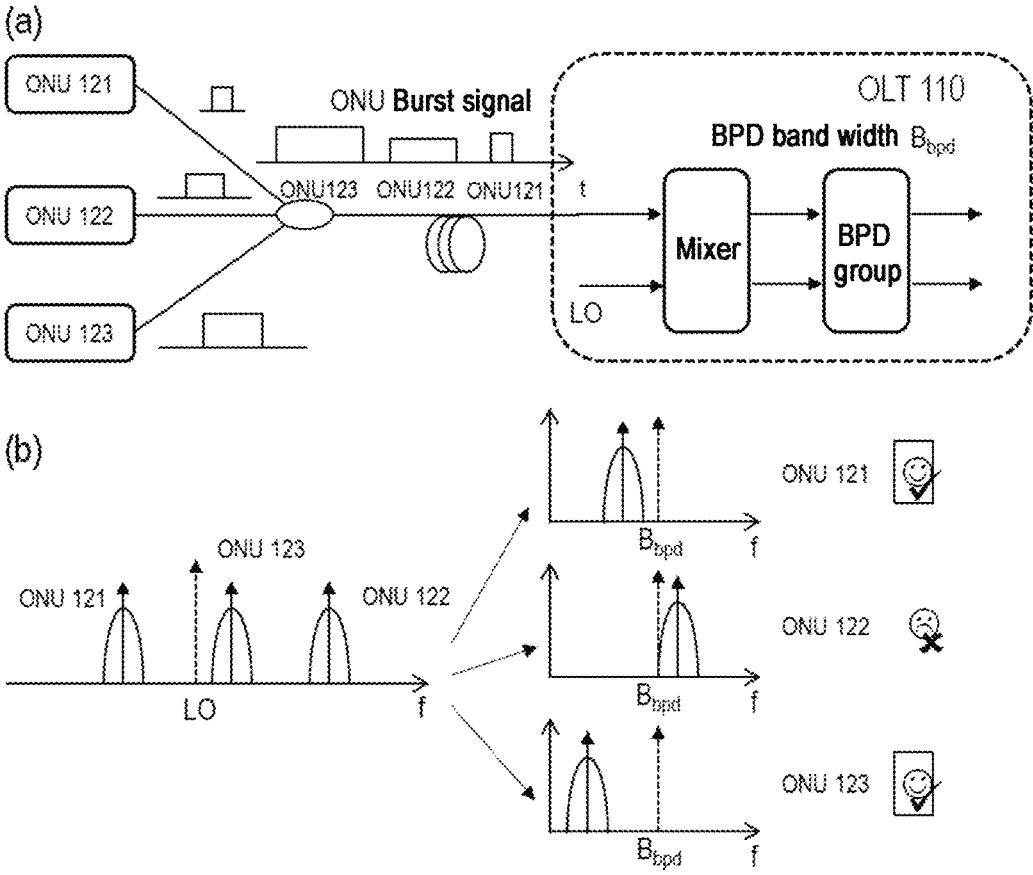
FIG. 1B shows a schematic diagram of coherent detection of the ONU's uplink burst mode signal.

As described, in a coherent PON system, there may be some problems that the signal of the ONU cannot be received by the OLT. FIG. 1B shows a schematic diagram of coherent detection of the ONU's uplink burst mode signal, and for the purposes of discussion will be illustrated by reference to FIG. 1A. For example, FIG. 1B May relate to the ONU 121-123 and OLT 110 as shown in FIG. 1A.

(a) in FIG. 1B shows the coherent detection scheme for the uplink burst mode signal from ONU 121-123. In OLT, the signal from ONU 121-123 is successively fed into a mixer to combine with the continuous light wave signal of LO. The combined signal is fed into the BPD for beat processing. The beat processing process is shown in FIG. 1B (b). Three beat signals are generated after photoelectric conversion. Due to the limited bandwidth of BPD (as mentioned above, the bandwidth of BPD may only be tens of GHz), the burst signal from ONU 122 and the beat signal of LO are beyond the detection range of BPD. Will not be able to successfully receive any signal from ONU 122 in OLT.

Figure 1C:
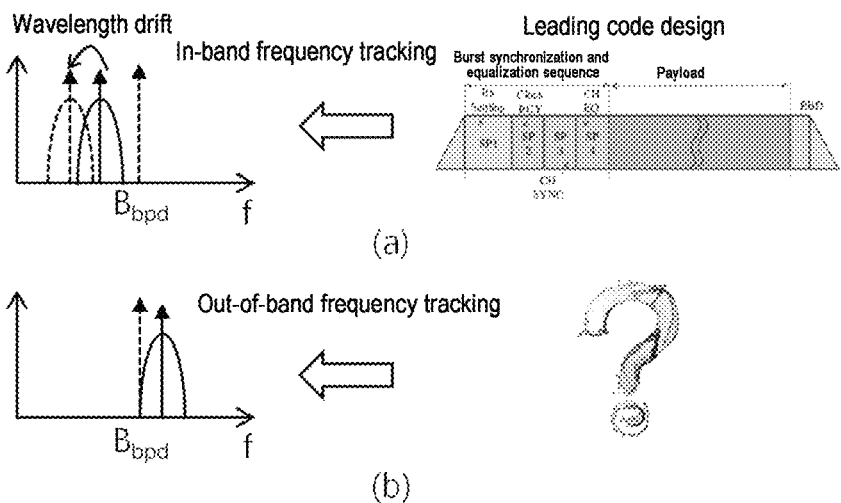
FIG. 1C shows the schematic diagram of in-band frequency tracking scheme and out-of-band frequency tracking problem in coherent PON system.

Coherent detection of uplink burst mode signals is a relatively new topic in high-speed optical access networks. Generally, there are two different frequency tracking problems in this detection scheme, namely in-band and out-of-band frequency (wavelength) tracking. Here, the terms in-band and out-of-band indicate whether the spectrum of the beat signal is within the BPD bandwidth. FIG. 1C shows a schematic of the in-band frequency tracking scheme and the out-of-band frequency tracking problem in a coherent PON system. For in-band tracking scenarios, efficient leading codes have been proposed and designed for estimating wavelength drift from different ONUs. However, since the signal cannot be detected in a coherent receiver, there is still a lack of viable methods to solve the out-of-band frequency (wavelength) tracking problem.

The above out-of-band frequency (wavelength) tracking problem is addressed at least in part by a wavelength tracking mechanism provided by some embodiments of the present disclosure, in which the OLT can configure the laser chip temperature of the ONU using temperature adjustment information to regulate the wavelength of the ONU, and the wavelength of the ONU and the temperature corresponding to that wavelength are tracked (e.g., using wavelength tracking tables). In addition, a specially designed registration signal is provided for a new ONU to access the OLT to further avoid the problem that the ONU's signal cannot be received by the OLT.

Figure 2:
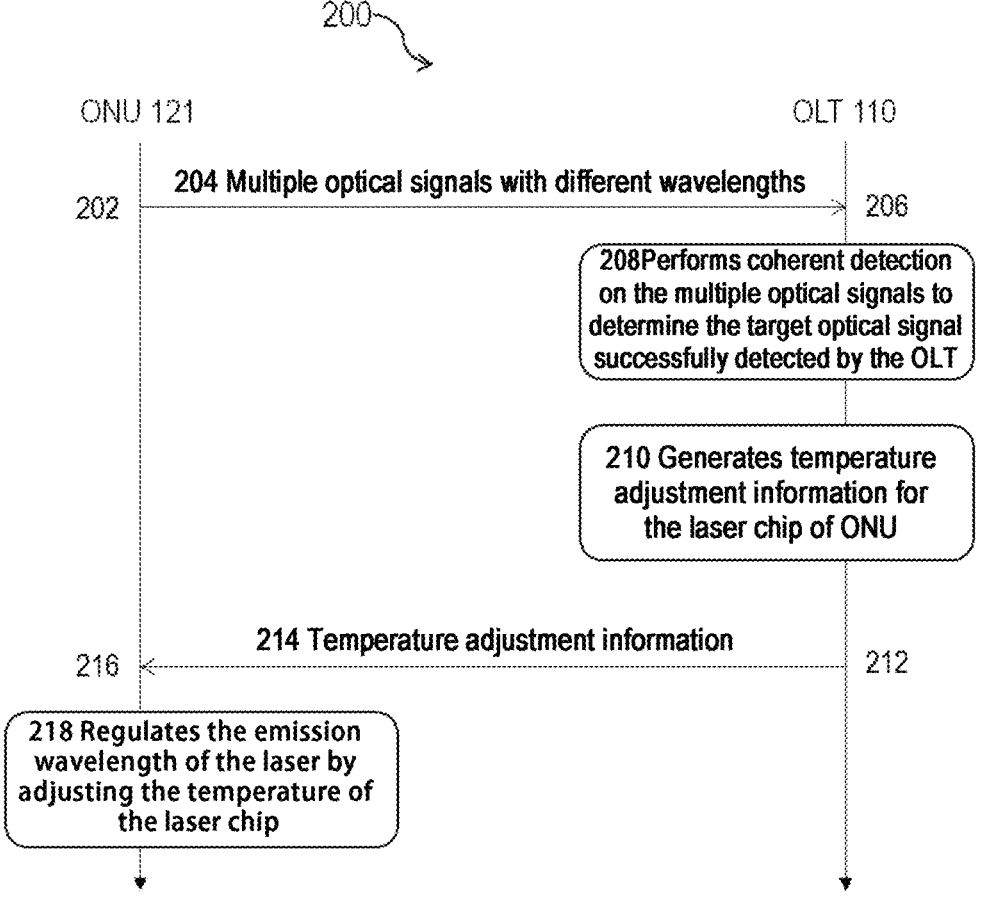
FIG. 2 shows a signaling diagram of the interaction process between ONU and OLT according to some embodiments of the present disclosure.

FIG. 2 shows a signaling diagram of the interaction process between an ONU and an OLT according to some embodiments of the present disclosure. The interaction process 200 May, for example, involve OLT 110 and ONU 121 as shown in FIG. 1A.

As shown in FIG. 2, the ONU 121 sends 202 multiple optical signals with different wavelengths to the OLT 110 204. The optical signals in the multiple optical signals carry indication information that is used to indicate the wavelength serial number of the optical signal and the temperature information of the laser chip at the time the optical signal is generated. After receiving multiple optical signals of 206 with different wavelengths from the ONU 121, the OLT 110 performs coherent detection on the multiple optical signals to determine the target optical signal of the more than 208 optical signals successfully detected by the OLT 110. Based on the target light signal and the local oscillator light signal of the OLT 110, the OLT 110 generates temperature adjustment information for the laser chip of the 210 for the ONU.

The OLT 110 then sends 212 temperature adjustment information 214 to the ONU 121. After receiving the 216 temperature adjustment information, the ONU 121 regulates the emission wavelength of the 218 laser by adjusting the temperature of the laser chip based on the temperature adjustment information.

Figure 3:
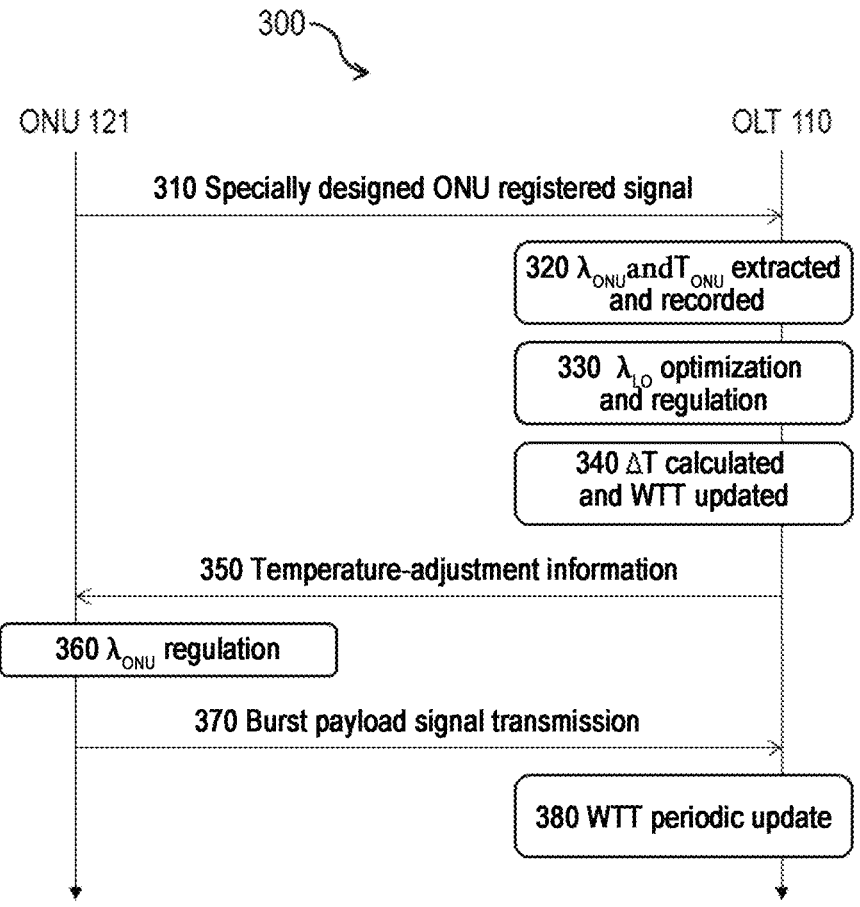
FIG. 3 shows a signaling diagram of the interaction process between an ONU and an OLT first connected to an OLT in uplink burst mode coherent PON according to some embodiments of the present disclosure.

FIG. 3 shows a signaling diagram of the interaction process 300 between the ONU and the OLT first registered to the OLT in uplink burst mode coherent PON according to some embodiments of the present disclosure. Interaction process 300 May, for example, involve the interaction of an ONU 121 as shown in FIG. 1A when it is first connected to an OLT 110.

As shown in FIG. 3, at 310, the ONU 121 first connected to the OLT 110 accesses the OLT 110 with a specially designed registered signal. The registration signal repeats the registration information at different wavelengths with certain spacing, which can be achieved by the ONU's thermo-electric cooler (TEC). In each repeat signal, the temperature value of the TEC and the wavelength serial number of the ONU are carried.

Figure 4:
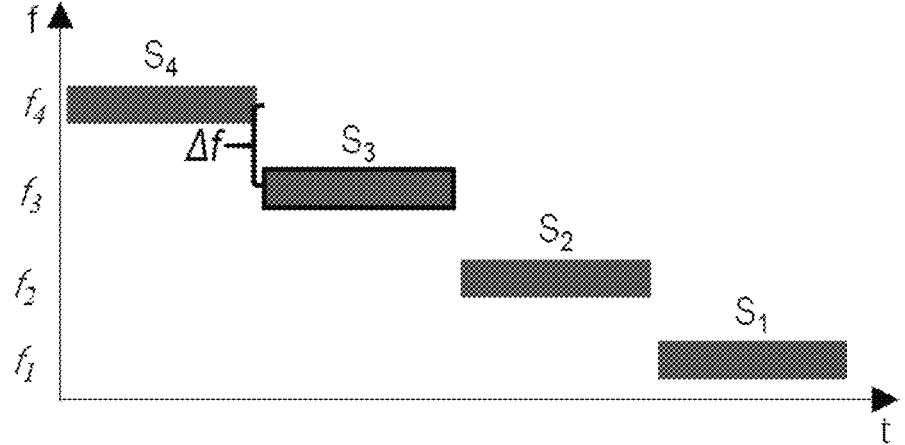
FIG. 4 shows a structural diagram of a specially designed registration signal for an ONU first connected to an OLT according to some embodiments of the present disclosure.

FIG. 4 illustrates the structure of the specially designed register signal. In a traditional IM/DD PON, the ONU sends only one registered signal, such as only S1, but in a coherent PON system, the registered signal is repeated at different frequencies/wavelengths to avoid undetectable signals in the OLT. In addition, in order to improve transmission efficiency, the frequency interval A f between adjacent signals is maximized, depending on the BPD bandwidth in the OLT coherent receiver. In addition, the serial number of the wavelength and the corresponding temperature value are appended to the registered signal to facilitate the extraction of information by the OLT.

Continuing with reference to 320 in FIG. 3, when a signal from ONU 121 is detected, the OLT 110 obtains the wavelength of the ONU by calculating the intermediate frequency (IF) of the coherent received post-beat signal, and then records the wavelength and corresponding temperature of the ONU 121 in the WTT.

Figure 5:
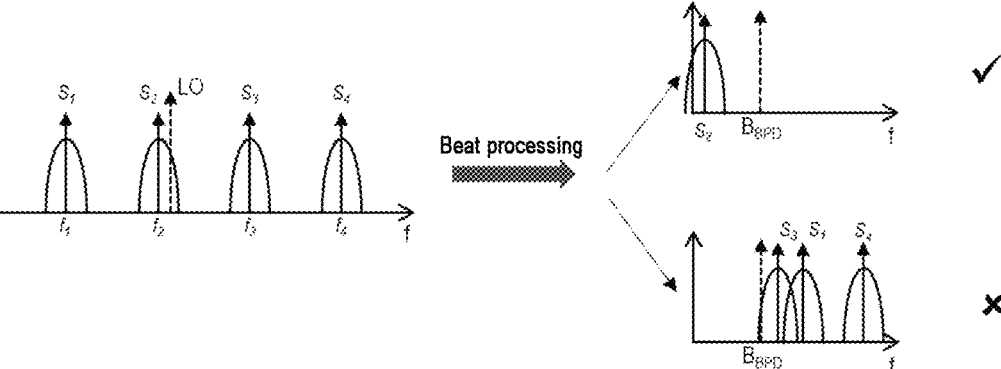
FIG. 5 shows schematics of beat frequency processing of different wavelength registered signals based on some embodiments of the present disclosure in balanced photo-detectors (BPD)

For example, in OLT 110, the received registered signals {S1, S2, S3, and S4} are mixed with the local oscillator light of the LO via an optical mixer and then fed into the four BPD. The spectrum of the beat signal after BPD processing is shown in FIG. 5. As can be seen, only the beat signal of S2 is within the BPD bandwidth, and the other three signals will be ignored due to the filtering effect of BPD. In this way, the wavelength and temperature information carried by S2 will be extracted by the OLT's digital signal processor and then recorded in the WTT.

Continuing with reference to 330 in FIG. 3, the wavelength and temperature groups in the WTT are expanded with the addition of the new ONU, and the wavelength ($\lambda_{LO}$) of the LO of the OLT 110 will be optimized according to predefined rules. As an example, a pre-defined rule could include the minimum total amount of adjustments to adjust the temperature of all ONUs from room temperature, while setting maximum and minimum temperature thresholds for the ONUs. By solving this optimization problem, the value of $\lambda_{LO}$ is obtained and the LO wavelength of the OLT is adjusted accordingly.

At 340, OLT 110 calculates the appropriate wavelength value for ONU 121, with the aim of minimizing the IF between the new $\lambda_{LO}$ and the ONU wavelength. By using the conversion coefficient of temperature and wavelength (e.g., about 0.1 nm/K) it is easy to calculate the temperature value that the ONU 121 needs to adjust. After the calculation, the temperature adjustment information is sent to the ONU 121, which guarantees the small if of the beat signal after coherent detection. In addition, the ONU 121's new wavelength and temperature are updated in the WTT. In some embodiments, the OLT 121 can calculate and send to the ONU 121 the temperature value to which it needs to be adjusted, i.e. the target temperature value. Alternatively, OLT 121 May also transmit to ONU 121 the wavelength serial number of the coherently received registered signal (i.e., S2) and the temperature adjustment value, which the ONU 121 calculates based on the wavelength serial number, the temperature corresponding to the wavelength serial number, and the temperature adjustment value.

At 350, OLT 110 sends temperature adjustment information (for example, in control information) to ONU 121. When receiving the control information from the OLT 110, at 360, the ONU 121 uses TEC to adjust the wavelength of the emitter (e.g., laser). Then, at 370, the ONU 121 sends the payload signal at the adjusted wavelength to the OLT 110. It is worth noting that in some embodiments, OLT 110 will correct the wavelength value $\lambda_{ONU}$ of the ONU 121 recorded in the WTT by processing the received payload signal.

At 380, OLT 121 will periodically update the WTT using the wavelength and temperature information determined from the ONU's uplink signal.

Figure 6:
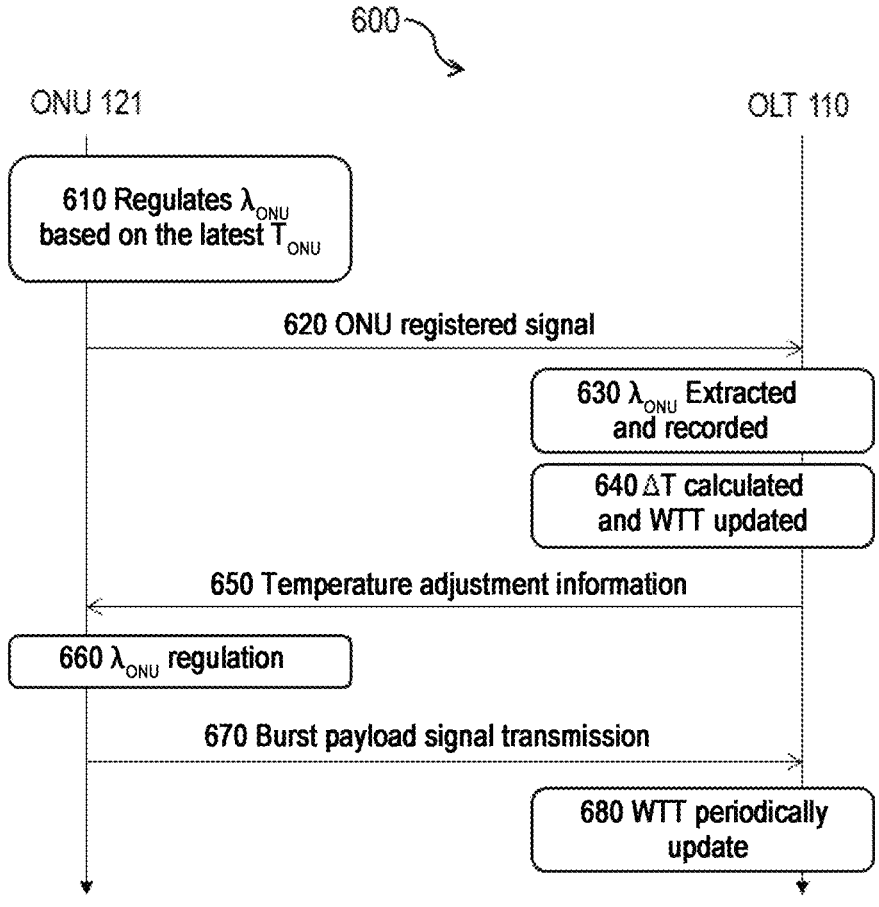
FIG. 6 shows the signaling diagram of the interaction process between the ONU registered to OLT in the uplink burst mode coherent PON according to some embodiments of the present disclosure and the OLT when it re-accesses the OLT.

FIG. 6 shows a signaling diagram of the interaction process between an ONU registered to the OLT and an OLT reconnecting to the OLT in the uplink burst mode coherent PON according to some embodiments of the present disclosure. For example, an ONU 121 that has been registered to OLT 110 is reconnected to OLT 110 after being disconnected from OLT 110.

Before reconnecting to OLT 110 to send a signal, at 610, the ONU 121 will adjust the chip temperature of the laser in the transmitter by TEC based on the latest temperature value $T_{ONU}$ provided by OLT 110 (for example, the temperature value provided by OLT 110 when it was last connected to OLT 110). Then, at 620, the ONU 121 sends the registered signal according to the wavelength that the $T_{ONU}$ is regulated to.

At 630, similar to when the ONU 121 was first connected to the OLT 110, the OLT 110's coherent receiver and Digital Signal Processing (DSP) extract the exact wavelength value $\lambda_{ONU}$, which is then recorded in the WTT.

At 640, the OLT 110 calculates the appropriate ONU wavelength and temperature value, designed to reduce the IF of the BPD post-beat signal, and this wavelength and temperature value is also updated in WTT. The corresponding temperature adjustment information is sent from OLT 110 to ONU 121 in process 650.

At 660, the ONU 121 uses TEC to fine-tune the wavelength of the laser. Then, at 670, the ONU 121 sends the payload signal to OLT 110 at the adjusted wavelength. Similarly, OLT 110 will correct the wavelength value $\lambda_{ONU}$ of the ONU 121 recorded in the WTT by processing the received payload signal.

Similarly, at 680, OLT 121 will periodically update the WTT using the wavelength and temperature information determined from the ONU's uplink signal.

Through the above process, the embodiment of the present disclosure provides a new method to solve the problem of out-of-band frequency tracking in uplink burst mode coherent detection. The OLT uses the temperature adjustment information to configure the laser chip temperature of the ONU to adjust the wavelength of the ONU, and the wavelength tracking table is used to track the wavelength of the ONU and the temperature corresponding to the wavelength. In addition, a specially designed registration signal is provided for the new ONU to access the OLT to further avoid the problem that the ONU's signal cannot be received by the OLT.

Figure 7:
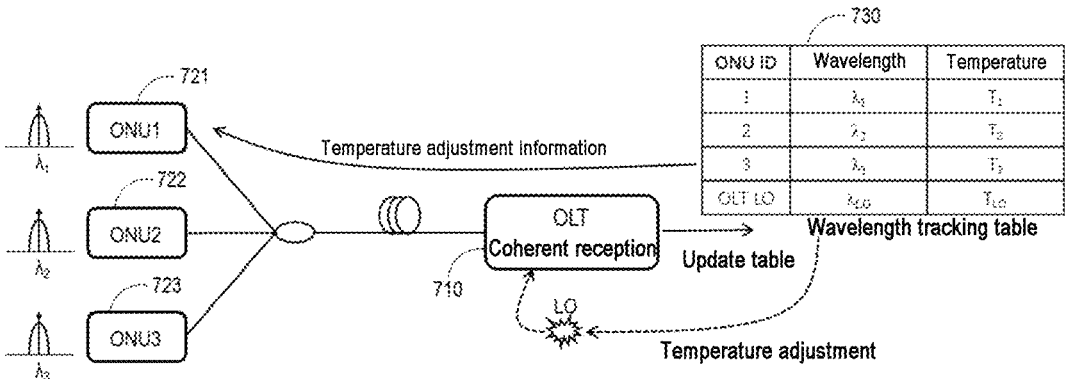
FIG. 7 shows a schematic diagram of coherent PON based on a wavelength tracking method of some embodiments of the present disclosure.

FIG. 7 shows a schematic diagram of the coherent PON for the proposed wavelength tracking method based on some embodiments of the present disclosure. As shown in FIG. 7, the OLT 710 tracks wavelength and temperature information for different ONUs (e.g., ONU 721-723) using wavelength tracking table 730, and periodically updates the wavelength tracking table based on the temperature and wavelength determined from the ONU's uplink signal. The wavelength of the LO of the OLT is also recorded in the wavelength tracking table and updated based on certain predefined rules. The OLT determines the appropriate wavelength for the ONU based on the wavelength tracking table, determines the temperature adjustment information based on the conversion coefficient of wavelength and temperature, and sends the temperature adjustment information to the ONU, which uses the temperature adjustment information to adjust the wavelength of the sent signal by adjusting the temperature of its laser chip.

Figure 8:
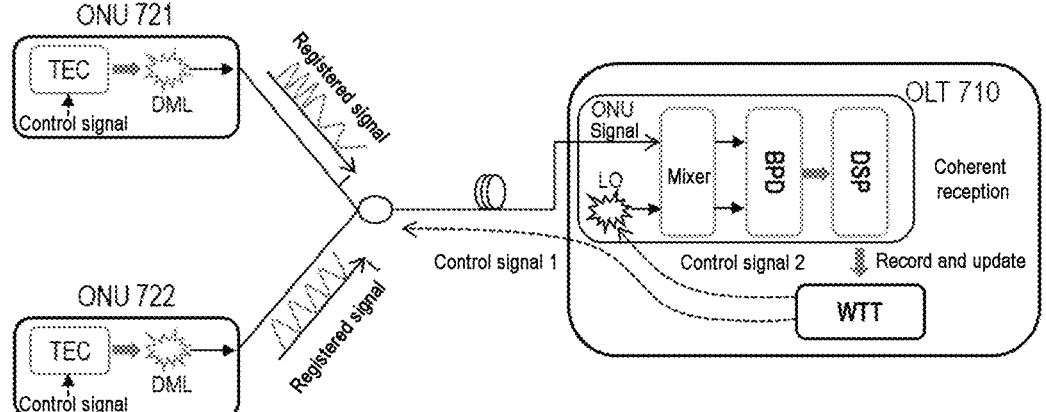
FIG. 8 shows schematics of modular components of OLT and ONU in coherent PON based on some embodiments of wavelength tracking methods of the present disclosure.

FIG. 8 shows a schematic of the modular components of an OLT and an ONU in a coherent PON based on a wavelength tracking method of some embodiments of the present disclosure. As shown in FIG. 8, an ONU (e.g. ONU 721-722) can adjust the emission wavelength of the DML using the TEC based on the control signal received from the OLT 710. The OLT can use wavelength tracking tables to generate temperature adjustment information for the ONU on the one hand and to optimize the output wavelength of the LO on the other hand. The wavelength tracking tables are updated periodically.

FIG. 9 shows a flow diagram of method 900 implemented at an ONU according to some example embodiments of the present disclosure. For the purposes of discussion, FIG. 9 will be described with reference to FIG. 1A, FIG. 2, FIG. 3, and FIG. 6. For example, FIG. 9 May relate to ONU 121 and OLT 110 as shown in FIG. 1A.

In block 910, the optical network unit (e.g., ONU 121) sends a plurality of optical signals with different wavelengths to the optical line terminal (e.g., OLT 110), and the optical signals in this plurality of optical signals carry indication information that is used to indicate the wavelength serial number of the optical signal and the temperature information of the laser chip at the time the optical signal is generated.

In block 920, the optical network unit receives temperature adjustment information from the optical line terminal. In block 930, based on the temperature adjustment information, the optical network unit regulates the emission wavelength of the laser by adjusting the temperature of the laser chip.

In some embodiments, multiple optical signals include multiple registered signals sent to the optical line terminal when the optical network unit is first connected to the optical line terminal. In some embodiments, the maximum frequency interval between multiple optical signals is determined based on the bandwidth of the balanced photodetector at the optical line terminal.

In some embodiments, the optical network unit determines the target temperature of the laser chip based on temperature adjustment information, and adjusts the emission wavelength of the laser to the target wavelength by adjusting the temperature of the laser chip to the target temperature. In some embodiments, the optical network unit obtains the target temperature directly indicated by the temperature adjustment information from the optical line terminal. In some embodiments, the temperature adjustment information indicates the wavelength serial number of the target optical signal determined by the optical line terminal and the amount of temperature adjustment for the target optical signal. In some embodiments, the optical network unit determines the temperature of the laser chip at the time of generating the target optical signal based on the wavelength serial number of the target optical signal, and the target temperature of the laser chip at the time of generating the target optical signal and the amount of temperature adjustment.

In some embodiments, the optical network unit sends a payload signal with the regulated emission wavelength to the optical line terminal.

In some embodiments, the optical network unit, after disconnecting from the optical line terminal and reconnecting to the optical line terminal, adjusts the emission wavelength of the laser to the initial target wavelength by adjusting the temperature of the laser chip to the initial target temperature determined by the optical line terminal at the last connection. The optical network unit also sends a registered signal with the initial target wavelength to the optical line terminal.

In some embodiments, the optical network unit receives additional temperature adjustment information from the optical line terminal, based on the additional temperature adjustment information, adjusts the laser emission wavelength to the updated target wavelength by adjusting the temperature of the laser chip to the updated target temperature, and sends a payload signal with the updated target wavelength to the optical line terminal.

FIG. 10 shows a flow diagram of method 1000 implemented at the OLT according to some of the sample embodiments of the present disclosure. For the purposes of discussion, FIG. 10 will be described with reference to FIG. 1A, FIG. 2, FIG. 3, and FIG. 6. For example, FIG. 10 May relate to OLT 110 and ONU 121 as shown in FIG. 1A.

In block 1010, the optical line terminal (e.g., OLT 110) receives multiple optical signals with different wavelengths from the optical network unit (e.g., ONU 121), and the optical signals in the multiple optical signals carry indication information, which is used to indicate the wavelength serial number of the optical signal and the temperature information of the laser chip at the time the optical signal was generated.

In block 1020, the optical line terminal performs coherent detection on multiple optical signals to determine the target optical signal successfully detected by the optical line terminal in the multiple optical signals. In block 1030, based on the target optical signal and the local oscillator optical signal of the optical line terminal, the optical line terminal generates temperature adjustment information for the laser chip used in the optical network unit. In block 1040, the optical line terminal sends temperature adjustment information to the optical network unit.

In some embodiments, multiple optical signals include: multiple registered signals sent to the optical line terminal when the optical network unit is first connected to the optical line terminal. In some embodiments, the maximum frequency interval between multiple optical signals is determined based on the bandwidth of the balanced photodetector at the optical line terminal.

In some embodiments, the optical line terminal beats multiple optical signals with the local oscillator optical signal to obtain multiple beat signals, input multiple beat signals to the balanced photodetector at the optical line terminal to determine the beat signal located within the bandwidth of the balanced photodetector, and the optical signal corresponding to the beat signal is determined as the target optical signal.

In some embodiments, the optical line terminal determines the original wavelength of the target optical signal based on the intermediate frequency of the beat signal and the frequency of the local oscillator optical signal, and records the optical network unit, the original wavelength of the target optical signal, and the original temperature indicated in the target optical signal in relation to it.

In some embodiments, the optical line terminal adjusts the wavelength of the local optical signal with predefined rules based on the wavelength of the target optical signal and the temperature information indicated by the target optical signal, as well as the wavelength and temperature associated with other optical network units connected to the optical line terminal. In some embodiments, the predefined rules include determining the wavelength of the regulated local oscillator signal such that the total amount of temperature adjustment at the optical line terminal and other optical line terminals is minimized.

In some embodiments, the optical line terminal beats the target optical signal with the regulated local oscillator signal to obtain the beat signal, and based on the IF frequency of the beat signal, the conversion factor between temperature and wavelength is used to determine the amount of temperature adjustment for the target optical signal. In some embodiments, the optical line terminal determines the target temperature of the laser chip for use in the optical network unit based on the amount of temperature adjustment and the temperature information indicated in the target optical signal, and generates the temperature adjustment information to indicate the target temperature.

In some embodiments, the optical line terminal determines the wavelength serial number of the target optical signal in the multiple wavelength serial number of the multiple optical signals included in the indication information, and generates the temperature adjustment information to indicate the wavelength serial number of the target optical signal and the amount of temperature adjustment for the target optical signal.

In some embodiments, the optical line terminal determines the target emission wavelength and target temperature associated with the optical network unit based on the temperature adjustment information, and uses the target emission wavelength and target temperature to update the original wavelength and original temperature recorded in relation to it. In some embodiments, the optical line terminal receives the payload signal with the target emission wavelength from the optical network unit. In some embodiments, the optical line terminal corrects the recorded target emission wavelength and target temperature associated with the first payload signal based on the wavelength and temperature corresponding to it.

In some embodiments, the optical line terminal periodically updates the associated recorded target emission wavelength and target temperature based on the corresponding wavelengths and temperatures of the multiple upstream signals received from the optical network unit, and if the intermediate frequency of the beat signal associated with the optical network unit is determined to be higher than the threshold based on the updated target emission wavelength and target temperature, Sends additional temperature adjustment information to the optical network unit.

In some embodiments, after the optical network unit is disconnected from the optical line terminal, the optical line terminal receives a registered signal sent at the initial target wavelength from the optical network unit, where the optical network unit adjusts the laser to the initial target wavelength based on the initial target temperature determined by the optical line terminal at the time of the last connection. In some embodiments, the optical line terminal, based on the registered signal, determines additional temperature adjustment information for the laser chip used in the optical network unit, based on additional temperature adjustment information, determines the updated target wavelength and updated target temperature associated with the optical network unit, and uses the updated target wavelength and updated target temperature. To update the initially recorded target wavelength and initial target temperature associated with the optical network unit.

In some embodiments, the optical line terminal sends additional temperature adjustment information to the optical network unit. In some embodiments, the optical line terminal receives a payload signal with an updated target wavelength from the optical network unit.

According to the embodiment of the present disclosure, a wavelength tracking mechanism is provided for uplink communication of coherent PON, in which the OLT may configure the laser chip temperature of the ONU using temperature adjustment information to regulate the wavelength of the ONU, and the wavelength of the ONU and the temperature corresponding to that wavelength are tracked (e.g., using a wavelength tracking table). In addition, a specially designed registration signal is provided for a new ONU to access the OLT to further avoid the problem that the ONU's signal cannot be received by the OLT.

In some example embodiments, Method 900 described above with reference to FIG. 9 May be executed by including means for performing the corresponding steps in Method 900. These means may be implemented in any appropriate form. For example, means can be implemented in circuits or software modules.

In some embodiments, a device includes components for the following operations: sending a plurality of optical signals with different wavelengths to an optical line terminal, the optical signals in the plurality of optical signals carry indication information, which is used to indicate the wavelength serial number of the optical signal and the temperature information of the laser chip at the time the optical signal is generated; Receiving temperature adjustment information from the optical line terminal; And based on the temperature adjustment information, the emission wavelength of the laser is adjusted by adjusting the temperature of the laser chip.

In some embodiments, a plurality of optical signals include: a plurality of registered signals sent to the optical line terminal when the optical network unit is first connected to the optical line terminal. In some embodiments, the maximum frequency interval between the multiple optical signals is determined based on the bandwidth of the balanced photodetector of the optical line terminal.

In some embodiments, a part for regulating the emission wavelength of the laser includes a part for determining the target temperature of the laser chip based on the temperature adjustment information; And adjusting the emission wavelength of the laser to the target wavelength by adjusting the temperature of the laser chip to the target temperature. In some embodiments, a part for determining the target temperature of the laser chip includes a part for obtaining the target temperature directly indicated by the temperature adjustment information from the optical line terminal. In some embodiments, the temperature adjustment information indicates the wavelength serial number of the target optical signal determined by the optical line terminal and the amount of temperature adjustment for the target optical signal.

In some embodiments, a component for determining the target temperature of the laser chip includes a component for the following operations: based on the wavelength serial number of the target optical signal, determine the temperature of the laser chip at the time the target optical signal is generated; And determine the target temperature of the laser chip based on the temperature and the temperature adjustment amount of the laser chip at the time of generating the target optical signal.

In some embodiments, the device also includes a component for sending a payload signal with an adjusted emission wavelength to the optical line terminal. In some embodiments, the device also includes a part for the following operations: after disconnecting from the optical line terminal and reconnecting to the optical line terminal, the emission wavelength of the laser is adjusted to the initial target wavelength by adjusting the temperature of the laser chip to the initial target temperature determined by the optical line terminal at the last connection; And sending a registered signal with the initial target wavelength to the optical line terminal.

In some embodiments, the device also includes components for the following operations: receiving additional temperature adjustment information from the optical line terminal; Based on the additional temperature adjustment information, the emission wavelength of the laser is adjusted to the updated target wavelength by adjusting the temperature of the laser chip to the updated target temperature; And sending a payload signal with the updated target wavelength to the optical line terminal.

In some embodiments, the device also includes a device for performing other steps of method 900 in some embodiments. In some embodiments, the device includes at least one processor; And at least one memory including computer program code, which together with at least one processor are configured to cause execution of the device.

In some example embodiments, method 1000 described above with reference to FIG. 10 May be executed by including means for performing the corresponding steps in method 1000. These means may be implemented in any appropriate form. For example, means can be implemented in circuits or software modules.

In some embodiments, a device includes components for the following operations: receiving a plurality of optical signals with different wavelengths from an optical network unit, the optical signals in the plurality of optical signals carry indication information, which is used to indicate the wavelength serial number of the optical signal and the temperature information of the laser chip at the time the optical signal is generated; Coherent detection is performed on the multiple optical signals to determine the target optical signal successfully detected by the optical line terminal in the multiple optical signals; Temperature adjustment information of the laser chip for the optical network unit is generated based on the target optical signal and the local oscillator optical signal of the optical line terminal; And send the temperature adjustment information to the optical network unit.

In some embodiments, the multiple optical signals include: a plurality of registered signals sent to the optical line terminal when the optical network unit is first connected to the optical line terminal. In some embodiments, the maximum frequency interval between the multiple optical signals is determined based on the bandwidth of the balanced type photodetector of the optical line terminal.

In some embodiments, the component for determining the target optical signal includes a component for: beating the multiple optical signals with the local oscillator optical signals to obtain multiple beat signals; The multiple beat signals are input to a balanced photodetector at the end of the optical line to determine the beat signal located within the bandwidth of the balanced photodetector; And the optical signal corresponding to the beat signal is determined as the target optical signal.

In some embodiments, the device also includes components for the following operations: determining the original wavelength of the target optical signal based on the intermediate frequency of the beat signal and the frequency of the local oscillator optical signal; And associatively record the optical network unit, the original wavelength of the target optical signal, and the original temperature indicated in the target optical signal.

In some embodiments, the device also includes components for regulating the wavelength of the local optical signal with predefined rules based on the wavelength of the target optical signal and the temperature information indicated by the target optical signal, as well as the wavelength and temperature associated with other optical network units connected to the optical line terminal. In some embodiments, the predefined rules include determining the wavelength of the local oscillator signal after adjustment such that the total amount of temperature adjustment of the optical line terminal and the other optical line terminal is minimized.

In some embodiments, the device also includes a component for: beating the target optical signal with the regulated local optical signal to obtain a beat signal; And using the conversion factor between temperature and wavelength to determine the amount of temperature adjustment for the target optical signal based on the intermediate frequency of the beat signal. In some embodiments, a part for generating the temperature adjustment information includes a part for determining the target temperature of the laser chip for the optical network unit based on the temperature regulation amount and the temperature information indicated in the target optical signal; And the generation of the temperature adjustment information to indicate the target temperature.

In some embodiments, a component for determining the temperature adjustment information includes a component for determining the wavelength serial number of the target optical signal among the multiple wavelength serial numbers of the multiple optical signals included in the indicated information; And generating the temperature adjustment information to indicate the wavelength serial number of the target optical signal and the amount of temperature adjustment for the target optical signal.

In some embodiments, the device also includes components for determining the target emission wavelength and target temperature associated with the optical network unit based on the temperature adjustment information; And using the target emission wavelength and the target temperature to update the original wavelength and the original temperature, which are recorded associatively. In some embodiments, the device also includes a part for receiving a payload signal with the target emission wavelength from the optical network unit.

In some embodiments, the device also includes means for the following operations: correcting the target emission wavelength and the target temperature recorded associatively, based on the wavelength and temperature corresponding to the first payload signal. In some embodiments, the device also includes means for the following operations: periodically updating the target emission wavelength and the target temperature recorded associatively based on the corresponding wavelengths and temperatures of the multiple uplink signals received from the optical network unit; And sending additional temperature adjustment information to the optical network unit if the IF frequency of the beat signal associated with the optical network unit is higher than a threshold based on the updated target emission wavelength and the target temperature.

In some embodiments, the device also includes means for the following operations: After the optical network unit is disconnected from the optical line terminal, a registered signal sent at the initial target wavelength is received from the optical network unit, where the optical network unit adjusts the laser to the initial target wavelength based on the initial target temperature determined by the optical line terminal at the time of the last connection.

In some embodiments, the device also includes a component for determining additional temperature adjustment information for the laser chip for the optical network unit based on the registered signal; The updated target wavelength and updated target temperature associated with the optical network unit are determined based on the additional temperature adjustment information; And using the updated target wavelength and the updated target temperature to update the initial target wavelength and the initial target temperature recorded in association with the optical network unit.

In some embodiments, the device also includes a component for transmitting the additional temperature adjustment information to the optical network unit. In some embodiments, the device also includes a part for receiving a payload signal with the updated target wavelength from the optical network unit.

In some embodiments, the device also includes a device for performing the other steps of Method 1000 in some embodiments. In some embodiments, the device includes at least one processor; And at least one memory including computer program code, which together with at least one processor are configured to cause execution of the device.

Figure 11:
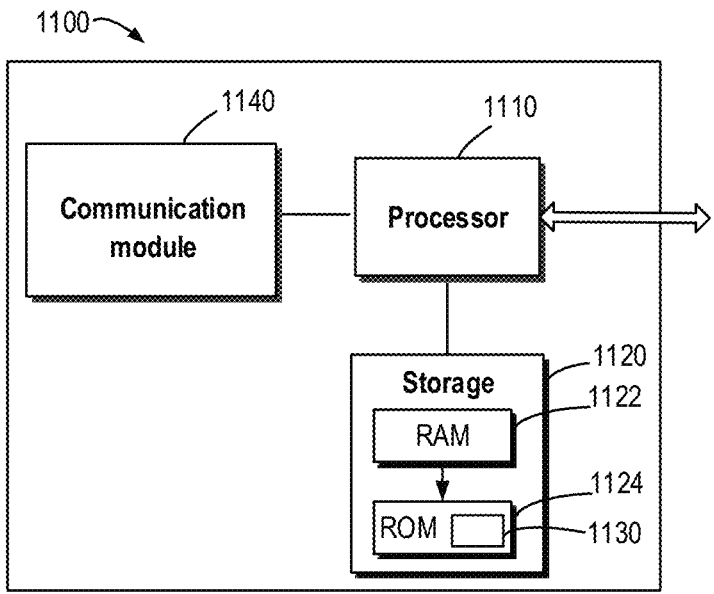
FIG. 11 shows a block diagram of the equipment suitable for implementing some of the embodiments of the present disclosure.

FIG. 11 shows a block diagram of the device 1100 suitable for implementing the example embodiment of the present disclosure. Device 1100 May be implemented at or as part of OLT 110 and ONU 121-123 as shown in FIG. 1A. As shown in FIG. 11, Device 1100 includes at least one processor 1110, at least one memory 1120 coupled to processor 1110, a communication module 1140 coupled to processor 1110, and a communication interface coupled to communication module 1140 (not shown). The memory 1120 stores at least the computer program 1130.

Communication module 1140 is used for two-way communication. The communication module 1140 has at least one antenna used to facilitate communication. The communication interface may represent any interface necessary for communication.

The processor 1110 executes instructions that cause the device 1100 to perform the operations and features associated with OLT 110 and ONU 121 as described above with reference to FIGS. 2 through 10. As an example, the training process function of the encoding scheme model can be performed on the OLT 110 by executing instructions. All of the features described in reference FIGS. 2 to 10 above apply to the device 1100 and will not be repeated here.

The processor 1110 May be of any suitable type for the local technology environment and may include one or more of the following: general-purpose computers, special-purpose computers, microprocessors, digital signal controllers (DSPS), and processors based on multi-core processor architectures. The device 1100 May include multiple processors, such as an application-specific integrated circuit chip that is time-dependent to a clock that synchronizes the main processor.

Memory 1120 May include one or more non-volatile memories and one or more volatile memories. Examples of non-volatile memory include, but are not limited to, ROM 1124, electrically programmable read-only memory (EPROM), flash memory, hard disk, optical disc (CD), digital video disc (DVD), and other magnetic storage devices and/or optical storage devices. Examples of volatile memory include, but are not limited to, random access memory (RAM) 1122 and other volatile memory that will not be maintained during a power outage.

A computer program 1130 includes computer-executable instructions executed by the associated processor 1110. The program 1140 can be stored in ROM 1124. The processor 1110 can perform arbitrary appropriate actions and processing by loading the program 1130 into RAM 1122.

Embodiments of the present disclosure may be implemented with the aid of program 1130 so that the device 1100 May perform any of the processes discussed in reference FIGS. 2 to 10 herein. The example embodiments of the present disclosure may also be implemented by hardware or by a combination of software and hardware.

Figure 12:
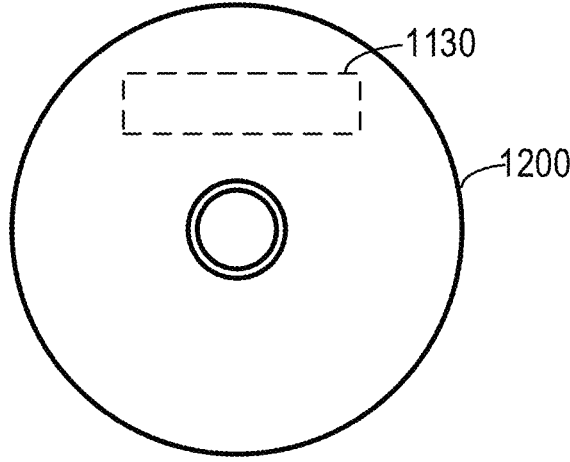
FIG. 12 shows a block diagram of a sample computer readable medium based on some embodiments of the present disclosure.

In some example embodiments, the program 1130 May be tangibly included in a computer readable medium that may be included in the device 1100 (for example, memory 1120) or other storage device accessible by device 1100. Device 1100 May load program 1130 from the computer readable medium into RAM 1122 for execution. Computer readable media can include any type of tangible non-volatile memory, such as ROM, EPROM, flash memory, hard disk, CD, DVD, etc. FIG. 12 shows an example of computer readable media 1200 in CD or DVD form. Computer readable media stores the program 1130 on it.

In general, the various example embodiments of this disclosure may be implemented in hardware or specialized circuits, software, logic, or any combination thereof. Some aspects may be implemented in hardware, while others may be implemented in firmware or software that can be executed by a controller, microprocessor, or other computing device. When aspects of an embodiment of the present disclosure are illustrated or described as a block diagram, flow diagram, or some other graphical representation, it is understood that the block, device, system, technique, or method described herein may be implemented as a non-restrictive example in hardware, software, firmware, specialized circuit or logic, general hardware or controller or other computing device, or some combination thereof.

The present disclosure also provides a product of at least one computer program that is physically stored on a non-transient computer-readable storage medium. A computer program product includes computer-executable instructions, such as those included in a program module, to be executed on a device on a target real or virtual processor to implement the methods described in reference FIGS. 2, 4, and 5 above. In general, program modules include routines, programs, libraries, objects, classes, components, data structures, etc., that perform a specific task or implement a specific abstract data structure. In various example embodiments, the functions of a program module may be merged or split between the described program modules. Machine-executable instructions for program modules may be executed locally or within distributed devices. In a distributed device, the program module can reside in both local and remote storage media.

Computer program code for implementing the methods of the present disclosure may be written in one or more programming languages. Such computer program code may be provided to a processor of a general-purpose computer, a special-purpose computer, or other programmable data processing device so that the program code, when executed by the computer or other programmable data processing device, causes the functions/operations specified in the flow chart and/or block diagram to be performed. The program code may be executed entirely on a computer, partly on a computer, as a stand-alone software package, partly on a computer and partly on a remote computer, or entirely on a remote computer or server.

In the context of this disclosure, computer program code or related data may be carried on any appropriate carrier to enable the device, device or processor to perform the processes and operations described above. Examples of vectors include signals, computer-readable media, and so on.

Examples of signals may include electrical, optical, radio, sound, or other forms of propagation, such as carrier, infrared, etc.

A computer readable medium may be a computer readable signal medium or a computer readable storage medium. Computer readable media may include, but are not limited to, electronic, magnetic, optical, electromagnetic, infrared, or semiconductor systems, devices, or devices, or any suitable combination thereof. More detailed examples of computer readable storage media include electrical connections with one or more wires, portable computer disks, hard disks, random storage access devices (RAM), read-only memory (ROM), erasable programmable Read only memory (EPROM or flash memory), optical fibers, portable optical disc Read Only memory (CD-ROM), optical storage devices, magnetic memory Storage device, or any suitable combination thereof.

In addition, although operations are depicted in a particular order, this should not be understood as requiring that such operations be performed in a particular order or in sequential order, or that all of the depicted operations be performed to obtain the desired result. In some cases, multitasking or parallel processing can be beneficial. Likewise, although the above discussion contains certain specific implementation details, this should not be interpreted as limiting the scope of any invention or claim, but rather as a description of specific embodiments that can be addressed to a particular invention. Certain features described in this specification in the context of separate embodiments may also be consolidated embodiments in a single embodiment. Conversely, various features described in the context of a single embodiment may also be implemented separately in multiple embodiments or in any suitable subcombination.

Although the subject matter has been described in language specific to structural features and/or methodological actions, it should be understood that the subject matter defined in the attached claims is not limited to the specific features or actions described above. Rather, the specific features and actions described above are disclosed as example forms for implementing the claims.

The invention claimed is:

1. An optical network unit, comprising:

at least one processor; and at least one memory stores instructions which, when executed, cause the optical network unit to perform, sending a plurality of optical signals with different wavelengths to an optical line terminal in a coherent passive optical network, the plurality of optical signals carrying indication information to indicate wavelength serial number of at least one of the plurality of optical signals and temperature information of a laser chip generating the at least one of the plurality of optical signals;

receiving temperature adjustment information from the optical line terminal, the temperature adjustment information based on an emission wavelength error; and adjusting, based on the temperature adjustment information, a temperature of the laser chip to adjust an emission wavelength of the at least one optical signal, the adjusted emission wavelength enabling out-of-band frequency tracking in the coherent passive optical network.

2. The optical network unit of claim 1, wherein the plurality of optical signals include a plurality of registered signals sent to the optical line terminal when the optical network unit is first connected to the optical line terminal, wherein the plurality of optical signals sent are repeated at different wavelengths with a maximum frequency interval between the plurality of optical signals based on a bandwidth of a balanced photodetector of the optical line terminal.

3. The optical network unit of claim 1, wherein a maximum frequency interval between the plurality of optical signals is determined based on a bandwidth of a balanced photodetector of the optical line terminal.

4. The optical network unit of claim 1, wherein the adjusting the temperature of the laser chip includes:
  determining a target temperature of the laser chip based on the temperature adjustment information; and
  adjusting the temperature of the laser chip to the target temperature.

5. The optical network unit of claim 4, wherein the target temperature is directly indicated by the temperature adjustment information obtained from the optical line terminal.

6. The optical network unit of claim 4, wherein
  the temperature adjustment information indicates the wavelength serial number of the at least one optical signal as determined by the optical line terminal, and the temperature adjustment information indicates an amount of temperature adjustment for the laser chip.

7. The optical network unit of claim 6, wherein the adjusting the temperature of the laser chip includes:
  determining, based on the wavelength serial number of the at least one optical signal, the temperature of the laser chip when the at least one optical signal is generated; and
  determining a target temperature of the laser chip based on the temperature of the laser chip at the time of generating the at least one optical signal and the amount of temperature adjustment.

8. The optical network unit of claim 1, wherein the optical network unit is further caused to perform:
  transmitting a payload signal with an adjusted transmitting wavelength to the optical line terminal.

9. The optical network unit of claim 1, wherein the optical network unit is further caused to perform:
  adjusting, after disconnecting from the optical line terminal and reconnecting to the optical line terminal, the emission wavelength of the laser to an initial target wavelength by adjusting the temperature of the laser chip to an initial target temperature determined by the optical line terminal at the time of the last connection; and
  sending a registered signal with the initial target wavelength to the optical line terminal.

10. The optical network unit of claim 9, wherein the optical network unit is further caused to perform:
  receiving additional temperature adjustment information from the optical line terminal;
  adjusting, based on the additional temperature adjustment information, the laser emission wavelength to an updated target wavelength by adjusting the temperature of the laser chip to an updated target temperature; and
  sending a payload signal with the updated target wavelength to the optical line terminal.

11. The optical network unit of claim 1, wherein the laser chip comprises a directly modulated laser.

12. The optical network unit of claim 1, wherein the adjusted emission wavelength is based on a bandwidth of a detector in the optical line terminal.

13. An optical line terminal, comprising:
  at least one processor; and
  at least one memory stores instructions that, when executed, cause the optical line terminal at least to perform,
  receiving a plurality of optical signals with different wavelengths from an optical network unit, the plurality of optical signals carrying indication information, which is used to indicate a wavelength serial number of at least one optical signal and temperature information of a laser chip when the at least one optical signal is generated;
  performing coherent detection on the plurality of optical signals to determine the at least one optical signal is successfully detected by the optical line terminal;
  generating temperature adjustment information of the laser chip for the optical network unit based on the at least one optical signal and a local oscillator optical signal of the optical line terminal; and
  sending the temperature adjustment information to the optical network unit.

14. A method for communication, including:
  sending, by an optical network unit, a plurality of optical signals with different wavelengths to an optical line terminal in a coherent passive optical network, the plurality of optical signals carrying indication information which is used to indicate a wavelength serial number of at least one optical signal of the plurality of optical signals and a temperature information of a laser chip when the at least one optical signal is generated;
  receiving temperature adjustment information from the optical line terminal, the temperature adjustment information based on an emission wavelength error; and
  adjusting, based on the temperature adjustment information, a temperature of the laser chip to adjust an emission wavelength of the at least one optical signal, the adjusted emission wavelength enabling out-of-band frequency tracking in the coherent passive optical network.

15. The method of claim 14, wherein the adjusting the temperature of the laser chip includes:
  determining a target temperature of the laser chip based on the temperature adjustment information; and
  adjusting the temperature of the laser chip to the target temperature.

16. A method for communication, including:
  receiving, by an optical line terminal, a plurality of optical signals with different wavelengths from an optical network unit, the plurality of optical signals bearing indication information, the indication information indicating a wavelength serial number of at least one optical signal and temperature information of a laser chip when the at least one optical signal is generated;
  performing coherent detection on the plurality of optical signals to determine the at least one optical signal is successfully detected by the optical line terminal in the plurality of optical signals;
  generating temperature adjustment information of the laser chip for the optical network unit based on the at least one optical signal and a local oscillator optical signal of the optical line terminal; and sending the temperature adjustment information to the
  optical network unit.

* * * * *